United States Patent [19]
Miltenberger et al.

[11] Patent Number: 5,957,483
[45] Date of Patent: Sep. 28, 1999

[54] COVERING FOR AN AIRBAG MODULE

[75] Inventors: Michael Miltenberger, Elsenfeld; Attila Dalkilic, Sulzbach; Martin Kreuzer, Kleinwallstadt; Klaus Grothe, Aschaffenburg, all of Germany

[73] Assignee: TRW Automotive Safety Systems GmbH, Aschaffenburg, Germany

[21] Appl. No.: 08/987,401

[22] Filed: Dec. 9, 1997

[30] Foreign Application Priority Data

Dec. 21, 1996 [DE] Germany ............................ 196 53 797

[51] Int. Cl.⁶ .................................................. B60R 21/16
[52] U.S. Cl. ........................................ 280/728.3; 280/732
[58] Field of Search ............................ 280/728.2, 728.3, 280/731, 732

[56] References Cited

U.S. PATENT DOCUMENTS

| | | | |
|---|---|---|---|
| 4,991,869 | 2/1991 | Hopf et al. | |
| 5,069,477 | 12/1991 | Shiraki | 280/732 |
| 5,335,935 | 8/1994 | Proos et al. | 280/732 |
| 5,395,668 | 3/1995 | Ito et al. | |
| 5,421,608 | 6/1995 | Parker et al. | |
| 5,449,197 | 9/1995 | Kerner | 280/731 |

FOREIGN PATENT DOCUMENTS

| | | |
|---|---|---|
| 3315535A1 | 4/1983 | Germany . |
| 3315535 | 3/1984 | Germany . |
| 3309131 | 9/1984 | Germany . |
| 3625487 | 2/1988 | Germany . |
| 3904977 | 1/1990 | Germany . |
| 4035975 | 10/1992 | Germany . |
| 4229562 | 12/1993 | Germany . |
| 19505214A1 | 2/1995 | Germany . |
| 6-247252 | 9/1994 | Japan .............................. 280/728.3 |
| WO92/09458 | 6/1992 | WIPO . |
| 94/25312 | 11/1994 | WIPO .............................. 280/728.3 |

OTHER PUBLICATIONS

Patent Abstracts of Japan, vol. 096, No. 005, May 31, 1996, JP 08 026061.
Patent Abstracts of Japan, vol. 097, No. 002, Feb. 28, 1997, JP 08 253087.
Patent Abstracts of Japan, vol. 097, No. 003, Mar. 31, 1997, JP 08 301053.

*Primary Examiner*—Paul N. Dickson
*Attorney, Agent, or Firm*—Sprung Kramer Schaefer & Briscoe

[57] ABSTRACT

A covering for an airbag module accommodated in the door lining and/or in the instrument panel of a vehicle. The covering has a main part of plastic comprising an airbag-attaching component and an airbag-covering component. The airbag-covering component can optionally be covered with expanded plastic. The module has a cover of real or imitation leather. There is at least one area in the form of a flap that can be ripped open in the vicinity of the airbag-covering component. The rip-open area is demarcated by a break-open line, constituted by a weakening of the material and by a hinging line. The covering is characterized by a groove-like outer depression along the break-open line that extends over the whole width of the covering and in that the cover is forced into the depression, doubling the material.

12 Claims, 3 Drawing Sheets

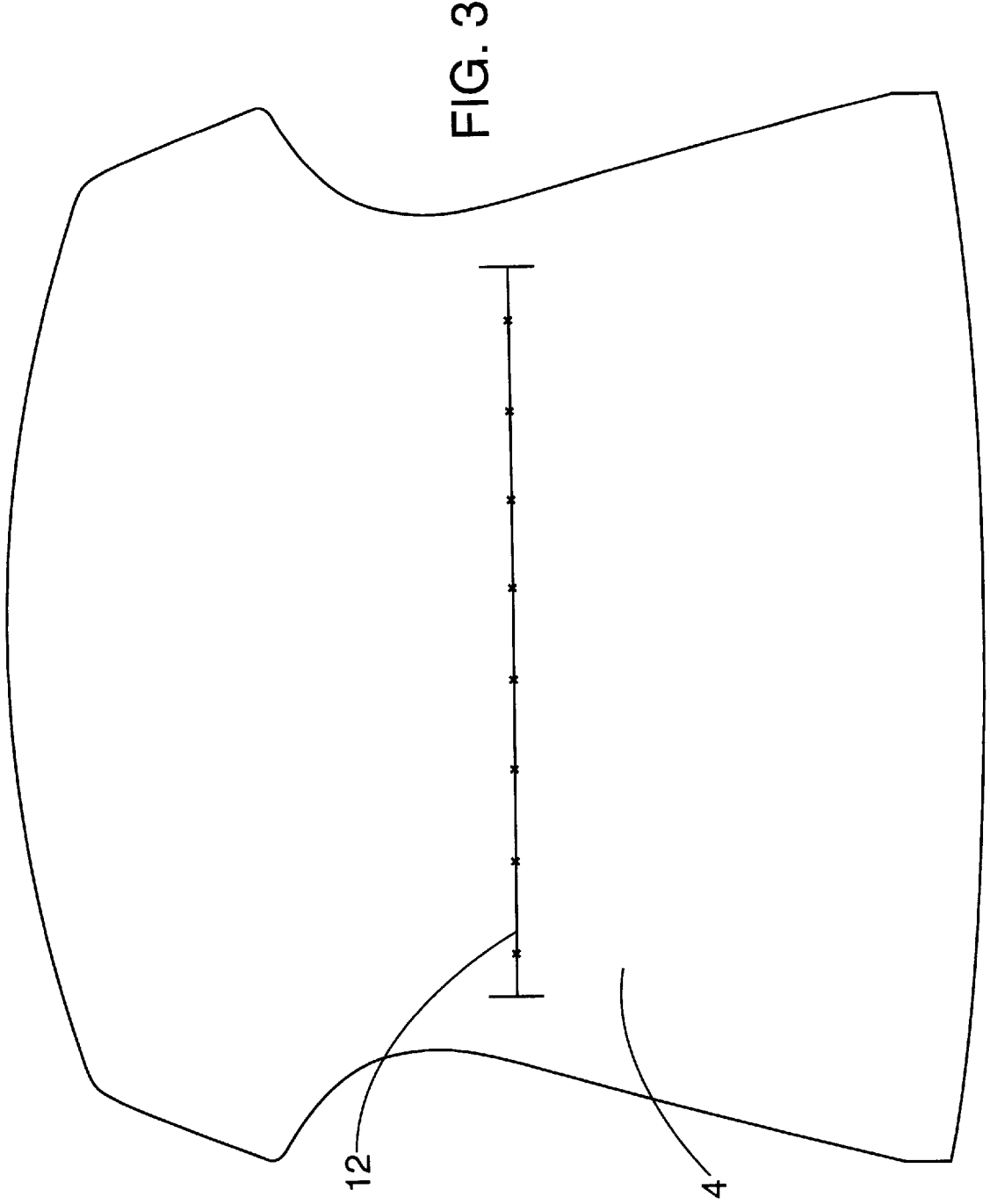

COVERING FOR AN AIRBAG MODULE

BACKGROUND OF THE INVENTION

The present invention concerns a covering for an airbag module accommodated in the door lining and/or in the instrument panel of a vehicle. The module has a main part of plastic comprising an airbag-attaching component and an airbag-covering component. The airbag-covering component can optionally be covered with expanded plastic. The module has a cover of real or imitation leather. There is at least one area in the form of a flap that can be ripped open in the vicinity of the airbag-covering component. The rip-open area is demarcated by a break-open line, constituted by a weakening of the material, and by a hinging line.

In most of the airbag-module coverings currently in use, the surface facing the driver consists of the textured skin, essentially without any cells, of a relatively soft expanded plastic molded around a hard and dimensionally stable main part. In various ways, such coverings allow, without any engineering complications worth mentioning, compliance with the contradictory requirements for adequate rigidity on the one hand and on the other for reliable opening when the airbag is needed. Still, when separate covers of real or imitation leather are employed, the compromise imposed by effective design of the break-open line entails considerable problems in that two different materials have to be taken into consideration. Their combined strength should not be enough to prevent the area from ripping open and their individual strengths should be enough to prevent it from ripping or breaking open unnecessarily subject to normal use throughout the life of the vehicle. Leather, a natural product, has in contrast to synthetic products a widely dispersed specific strength that extensively depends on temperature, humidity and can change considerably with age. It is accordingly extremely difficult to provide covers of real leather with a well defined long-term line-of-separation rip-open characteristic.

Plastic imitation leathers with a textured surface are of course less sensitive, although they have considerable tolerances in their specific strength, and can result in similar although less serious problems.

Covers of leather with separation areas in the form of punched-through areas the size of the rip-open flaps with strips of thin paper stitched to the back and extending across the incision to create the break-open line have accordingly been proposed (German 4 035 975 C2). Here, the desired specific rip-open resistance along the break-open line is that of the paper rather than that of the leather. Such resistance is obviously easier to reproduce in paper than in leather. Still, whether this approach is satisfactory in the final analysis depends on whether the paper itself exhibits the desired properties and whether they can be ensured throughout the life of the vehicle. Furthermore, this method of manufacture is very labor-intensive and must be carefully controlled to ensure that the paper is reliably attached to the leather. Finally, the perforations necessarily produced by the stitching represent an incalculable hazard.

SUMMARY OF THE INVENTION

The object of the present invention is accordingly an improved covering of the aforesaid type wherein the problems associated with leather cannot occur and wherein a break-open line can be produced at a justifiable expenditure of labor that will stand up to any stresses occurring in normal operation throughout the life of the vehicle and that will reliably separate and allow the airbag to unfold when needed.

This object is attained in accordance with the present invention by a groove-like outer depression along the break-open line that extends over the whole width of the covering and in that the cover is forced into the depression, doubling the material.

Tests of a covering of this kind have surprisingly revealed that the acute crease in the vicinity of the doubling is definitely sufficient in conjunction with the weakening of the expanded plastic to ensure unobjectionable ripping open when the airbag inflates. The cover is also gripped securely enough by the groove-like depression on the outside to resist severe stresses in the vicinity of separation. The result is a highly reliable break-open line in covers of real or imitation leather, which are also, as can be imagined, easy to manufacture.

Advantageous advanced embodiments are included wherein the groove-like outer depression is in the main part, the main part is discontinuous along the break-open line, the main part is upholstered with expanded plastic, the groove-like outer depression is in the expanded plastic, the groove-like outer depression is paralleled by a groove-like inner depression, the cover is incised along the break-open line in the vicinity of the doubling of the material, the cover is perforated along the break-open line in the vicinity of the doubling of the material, the cover is weakened by the removal of material from the area facing the base of the groove along the break-open line, the cover is weakened by stitching on one or both sides and adjacent to the groove-like outer depression, the cover is weakened by a combination of at least two of the aforesaid measures, the groove-like outer depression is dimensioned to retain within it the cover creating the doubling of the material, the hinging line extends along a weakening of the material in the main part, and the cover is permanently stitched on both sides to the main part and/or to the expanded plastic in the vicinity of the airbag-covering component and adjacent to the break-open line. Various embodiments of the present invention will now be specified with reference to the accompanying drawing, wherein

BRIEF DESCRIPTION OF THE DRAWINGS

FIG. 3 is a top view of a blank of leather to be employed for the covering around the center of an airbag module in a steering wheel.

DETAILED DESCRIPTION OF THE INVENTION

Figure 1:
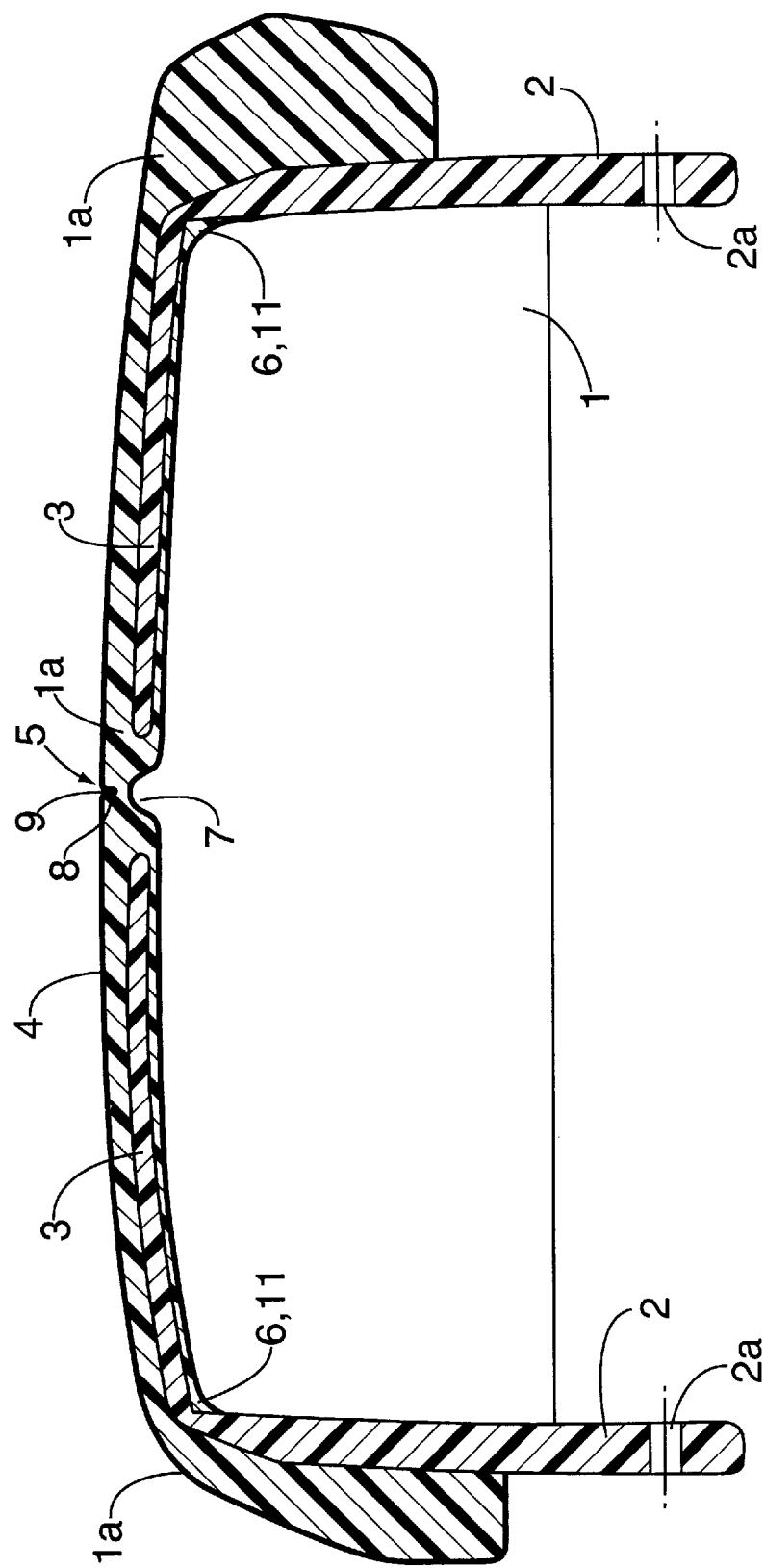
FIG. 1 is a section through a covering in accordance with the present invention.

The main part 1 of the embodiment illustrated in FIG. 1 is an inverted-pot shaped plastic component with a base and a wall. The wall of the pot extends downward and constitutes an attachment area 2 provided with perforations 2a. The bottom of the pot is perforated at the center and constitutes an airbag-covering component 3. Airbag-covering component 3 is upholstered with expanded plastic 1a. Expanded plastic 1a extends over the perforation through the middle of airbag-covering component 3 and accommodates a break-open line 5. Break-open line 5 is defined by a groove-like depression 8 on the outside and by another and parallel groove-like depression 7 on the inside, leaving enough expanded plastic 1a between them to provide the requisite strength. It is alternatively possible to provide only one depression, depression 8 for example, if the remaining expanded plastic 1a can ensure the desired level of strength.

Outer depression 8 extends in accordance with the present invention over the total width of the covering and is grooved and dimensioned to ensure that a cover 4 of real or imitation leather can be creased and forced into it, creating a doubling 9 of the material.

It has surprisingly been discovered that the acute crease in the cover material is in itself sufficient to weaken the material along break-open line 5 to the extent that the covering will break open unobjectionably when the airbag-inflation device ignites. In other words, the method of attaching a cover 4 in accordance with the present invention will decrease the unavoidable variations in the strength of the cover material to the extent that its resistance to ripping open will be reproducible within a narrow range.

Creasing and forcing the material in will also maintain the cover material almost free of stress along the break-out line in normal operation and reliably prevent premature and undesired ripping on the part of cover 4.

The attachment area 2 of main part 1 is fastened to airbag-covering component 3 along a hinging line 6 produced by an in-itself known procedure by a weakening 11 of the material. Expanded plastic 1*a* differs in thickness in accordance with the desired exterior shape of the covering and is completely covered by cover 4.

In an embodiment wherein a main part 1 is not covered by expanded plastic, outer depression 8 will be produced in an intact airbag-covering component 3, and cover 4 will be applied directly to main part 1.

Figure 2:
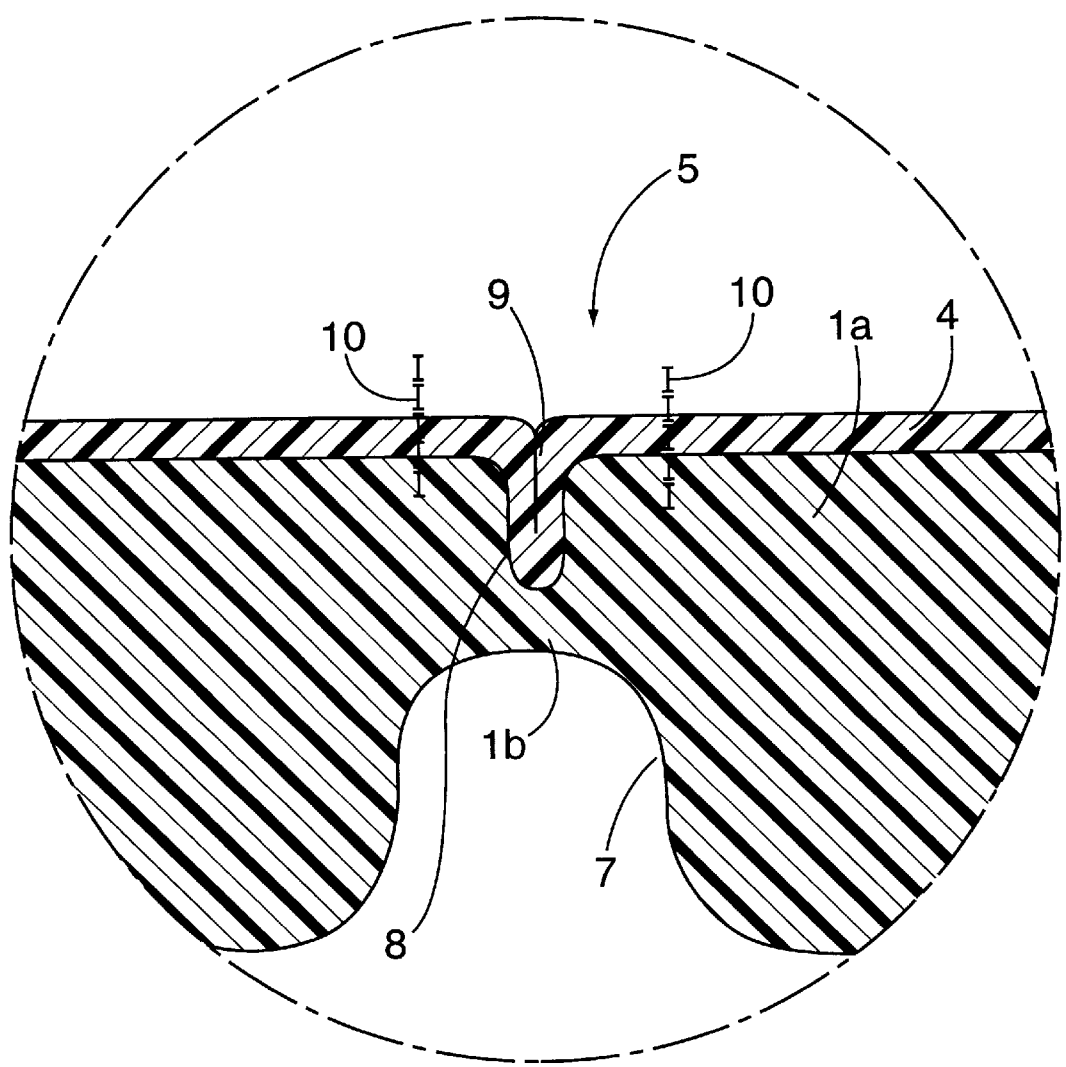
FIG. 2 is a larger-scale representation of part of FIG. 1.

FIG. 2 is a larger-scale detail of the area around the break-open line 5 illustrated in FIG. 1. Cover 4 is creased and forced into the outer groove-like depression 8 in expanded plastic 1*a*, creating a doubling 9 of the material. Whereas outer depression 8 is dimensioned in accordance with the thickness of the material and the depth it must be forced in to securely held in place, inner depression 7 is dimensioned to leave only a desired residual thickness 1*b* in expanded plastic 1*a*. Break-open lines 5 to satisfy any specific demand can accordingly be produced.

Cover 4 can be weakened by separating, perforating, or thinning it etc. at the base of outer depression 8 if the acute creasing is not enough by itself to produce the requisite weakening. Such additional measures will be carried out in an area of cover 4 that is both invisible and not subject to mechanical stress once it has been forced in. It is, however, alternatively possible to provide decorative stitching 10 to the right or left of break-open line 5. Possible locations for stitching 10 are represented by the vertical broken lines in FIG. 2. If stitching 10 is desired for styling, it can be exploited as an extra means of attaching cover 4 to airbag-covering component 3 while providing specifically defined extra weakening of the material.

FIG. 3 is a top view of a stamped-out cover 4 with an incision or perforation 12 in an area creased and forced into outer depression 8 in accordance with the present invention to produce doubling 9 of the material as represented in FIGS. 1 and 2.

What is claimed is:

1. A covering for an airbag module accommodated in at least one of the door lining and the instrument panel of a vehicle and comprising: a main part of plastic comprising an airbag-attaching component and an airbag-covering component covered with expanded plastic, a one-piece cover of one of real and imitation leather, at least one rip-open area in the form of a flap that can be ripped open in the vicinity of the airbag-covering component, and the at least one rip-open area is demarcated by a break-open line, constituted by a weakening of material of the airbag-covering component, a hinging line, and an outer surface depression comprising a groove along the break-open line that extends over the whole width of the covering and wherein the cover is forced into the depression, doubling the one of real and imitation leather.

2. The covering as in claim 1, wherein the outer surface depression is in the main part.

3. The covering as in claim 1, wherein the main part is discontinuous along the break-open line, and the outer surface depression is in the expanded plastic.

4. The covering as in claim 3, wherein the outer surface depression is paralleled by a inner surface depression comprising a groove.

5. The covering as in claim 1, wherein the cover is incised along the break-open line in the vicinity of the doubling of the one of real and imitation leather.

6. The covering as in claim 1, wherein the cover is perforated along the break-open line in the vicinity of the doubling of the one of real and imitation leather.

7. The covering as in claim 1, wherein the cover is weakened by the removal of one of real and imitation leather from an area facing a base of the groove along the break-open line.

8. The covering as in claim 1, wherein the cover is weakened by stitching on at least one side of the break-open line and adjacent to the outer surface depression.

9. The covering as in claim 1, wherein the cover is weakened by a combination of at least two of the cover being perforated along the break-open line in the vicinity of the doubling of the one of real and imitation leather, the removal of one of real and imitation leather from an area facing a base of the groove along the break-open line and stitching on at least one side of the break-open line and adjacent to the outer surface depression.

10. The covering as in claim 1, wherein the outer surface depression is dimensioned to retain the cover within it by the doubling of the one of real and imitation leather.

11. The covering as in claim 1, wherein the hinging line extends along a weakening of material in the main part.

12. The covering as in claim 1, wherein the cover is permanently stitched on both sides of the break-open line to at least one of the main part and the expanded plastic in the vicinity of the airbag-covering component and adjacent to the break-open line.

\* \* \* \* \*